United States Patent
Dillard

[15] 3,646,824
[45] Mar. 7, 1972

[54] PNEUMATIC SPINNER FOR LAND VEHICLE TIRES

[72] Inventor: Weldon B. Dillard, Lubbock, Tex.

[73] Assignees: Boyd Smith; Landon Smith, Lubbock, Tex., part interest to each

[22] Filed: Aug. 28, 1970

[21] Appl. No.: 67,680

[52] U.S. Cl. .................................................. 74/16, 73/457
[51] Int. Cl. ................................................... F16m 3/00
[58] Field of Search ............... 74/16; 73/457, 458, 459, 460, 73/461, 462; 180/66 F

[56] References Cited

UNITED STATES PATENTS

| | | | |
|---|---|---|---|
| 3,566,701 | 3/1971 | Hampton | 74/16 |
| 3,483,764 | 12/1969 | Hunter | 73/457 X |
| 3,105,387 | 10/1963 | Shoemaker et al. | 74/16 |
| 3,071,221 | 1/1963 | Hosking | 74/16 X |
| 3,030,815 | 4/1962 | Lill et al. | 74/16 |
| 2,823,547 | 2/1958 | Hosking | 74/16 |
| 2,565,233 | 8/1951 | Hunter, Jr. | 74/16 |
| 2,728,236 | 12/1955 | Hemmeter | 74/16 |

Primary Examiner—Carlton R. Croyle
Assistant Examiner—Richard J. Sher
Attorney—Charles W. Coffee

[57] ABSTRACT

In spinning auto tires for the purpose of balancing same, a radial vane, expansible chamber, rotary pneumatic motor is used.

5 Claims, 6 Drawing Figures

WELDON B. DILLARD - INVENTOR.

WELDON B. DILLARD—INVENTOR.

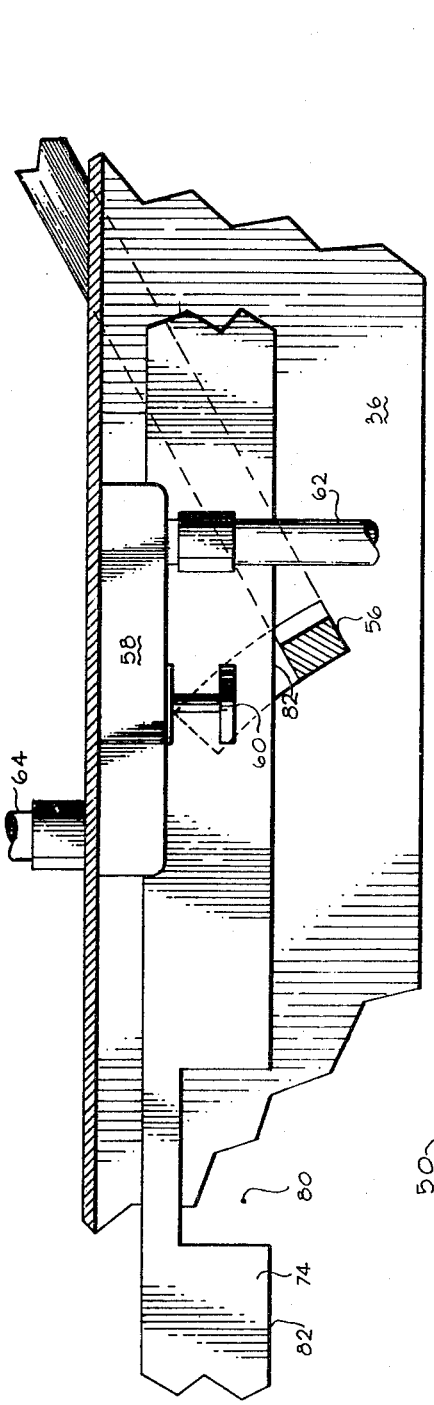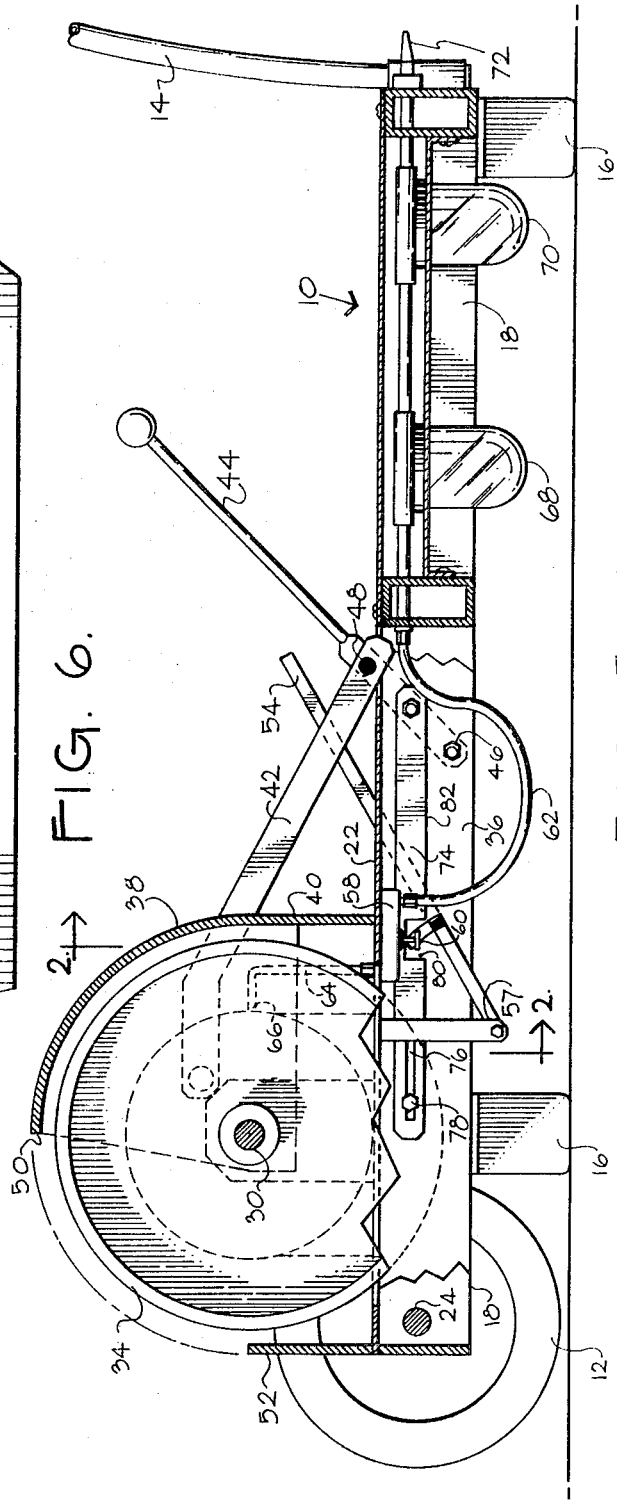

PNEUMATIC SPINNER FOR LAND VEHICLE TIRES

BACKGROUND OF THE INVENTION

1. Field of the Invention

This invention relates to balancing auto tires and more particularly to a device for spinning the tire while it is mounted upon the vehicle.

2. Description of the Prior Art

There are commercially on the market today, spinners for spinning auto tires while they are mounted on the vehicle. Generally, a wheeled carriage carries a pivoted platform having a spinner roller thereon. An electric motor is connected to the roller. In use, the spinner is moved adjacent to the vehicle which has been lifted so that the wheel is clear of the ground. The roller is then engaged with the wheel. The roller is rotated at a very high speed, thus spinning the tire so the balancing operation may be performed upon it. Also, some of the spinner rollers have guards over them which may be moved so the guard itself forms a brake to slow the tire for the purposes of mechanical work upon the wheel which carries the tire.

Often the mechanics in using these spinners use them for truck tires or tires on vehicles which are heavier than the spinners were intended to be used upon. This often results in damage to the electric motor, the motor is "burned out." It will be understood that in the initial spin of the tire, there is a very high torque load placed upon the motor at low speed.

In spinning other objects for balancing, e.g., gyroscope rotors, it has been suggested that air motors in the form of turbines be connected to the rotor to spin them. Examples of such devices are shown in ESVAL, U.S. Pat. No. 2,243,458, or KENT, U.S. Pat. No. 2,405,430.

SUMMARY OF THE INVENTION

1. New and Different Function

I have solved the problem by replacing the electric motor with an air motor. It will be noted that these spinning machines are used in tire repair shops where air is readily available. Also, radial vane, expansible chamber, rotary pneumatic motors are commercially available on the market and have excellent characteristics required for this task. I.e., they can operate at high speeds on the order of 7,000 r.p.m.; also at low speeds and high torques it is almost impossible to damage such a motor.

2. Objects of this Invention

An object of this invention is to spin an auto tire for purposes of balancing.

Another object is to provide a spinner which will not be damaged when used to spin a heavier tire or wheel than for which it was intended.

Further objects are to achieve the above with a device that is sturdy, compact, durable, lightweight, simple, safe, efficient, versatile, and reliable, yet inexpensive and easy to manufacture, operate, and maintain.

Still further objects are to achieve the above with a method that is versatile, rapid, efficient, and inexpensive, and does not require skilled people to adjust, operate, and maintain.

The specific nature of the invention, as well as other objects, uses, and advantages thereof, will clearly appear from the following description and from the accompanying drawing, the different views of which are not to the same scale.

BRIEF DESCRIPTION OF THE DRAWING

FIG. 5 is a sectional view taken substantially on line 5—5 of FIG. 2.

FIG. 6 is an enlarged sectional view showing details of construction.

DESCRIPTION OF THE PREFERRED EMBODIMENT

Figure 1:
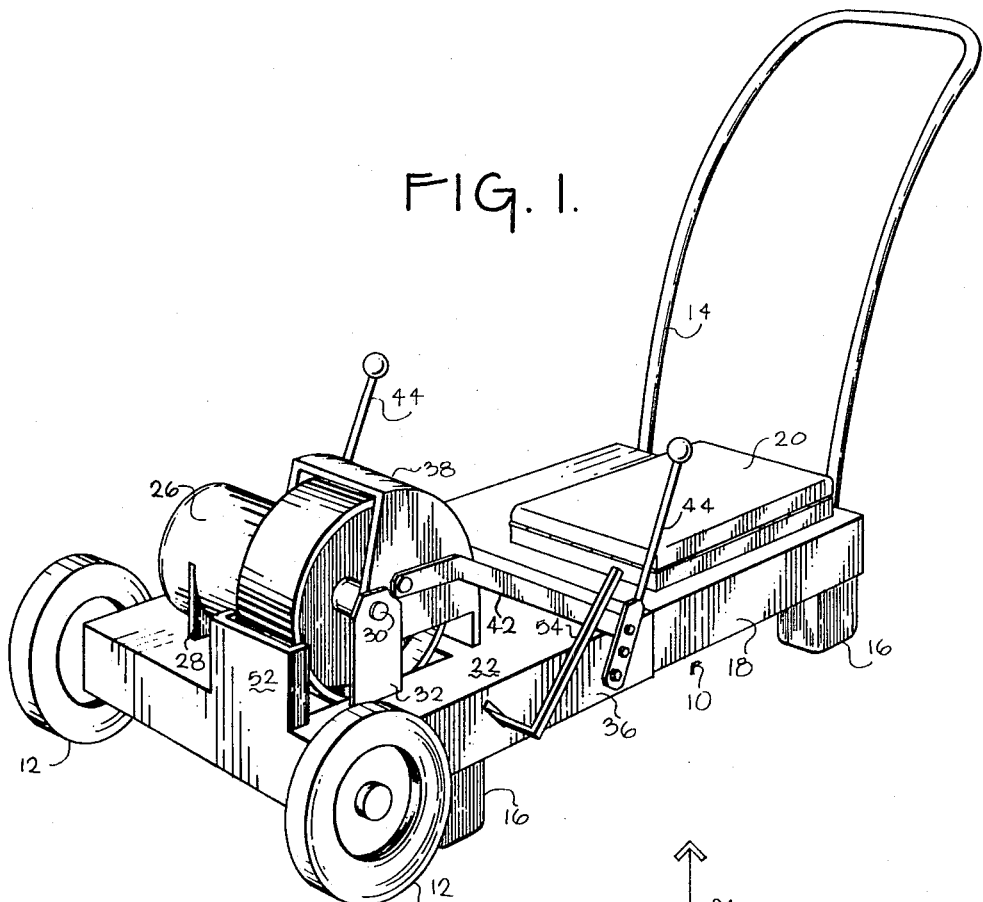
FIG. 1 is a perspective view of an embodiment of my invention.
Figure 2:
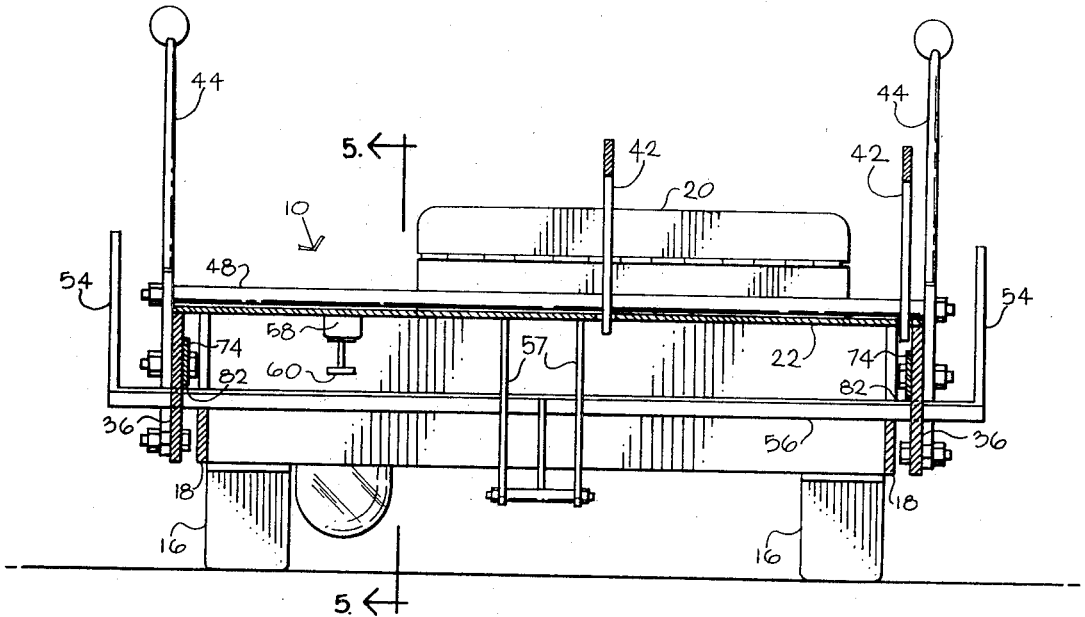
FIG. 2 is a sectional view of the invention taken substantially on line 2—2 of FIG. 5.

Referring to the drawing, particularly FIG. 1, it may be seen that the spinner has frame or carriage or chassis 10. Two ground engaging wheels 12 are attached to the front of the chassis and handle 14 is attached to the back. Four legs 16 depend from the chassis 10. When the chassis 10 is in a rest position, the legs 16 are slightly longer than the radius of the wheels 12 so that the wheel is slightly elevated from the ground. (FIGS. 2 and 5). Therefore, the spinner is well anchored into place. However, by picking up the handle 14, the spinner is quite mobile and readily moved from location to another.

The chassis 10 has two longitudinal beams 18 which extend from the handle 14 forward to the wheels 12 and to which the wheels are journaled. Also, it may be seen that the chassis has covered box 20 which is a convenient place for the storage of tools and equipment used by the mechanic when using the spinner.

Platform 22 is pivoted to bar 24. The axle for the wheels 12 forms the bar 24 to which the platform 22 is pivoted. Motor 26 is attached to the platform 22 by cradle 28. The motor is a rotary motor and has shaft 30 extending therefrom. The outboard end of the shaft 30 is supported by a bearing in pillar 32. Spinner roller 34 is attached to the motor shaft 30 between the motor 26 and the pillar 32. The pillar 32 is firmly connected to the platform 22.

The platform 22 includes two depending flanges 36 on either side, which are outboard of the beams 18. Quadrant cover 38 is journaled to the pillar 32 and the motor 26 coaxially with the motor shaft 30. The quadrant cover 32 is arcuate and covers approximately one-fourth of the roller 34. In the spinning position as seen in FIGS. 1, 2, and 5, the quadrant cover is a protective cover which protects the operator from the disintegration of the spinner roller 34, or from foreign material which might be thrown from the surface of the roller 34. In the spinning position, the cover 38 rests with its depending tail 40 against the platform 22.

Figure 3:
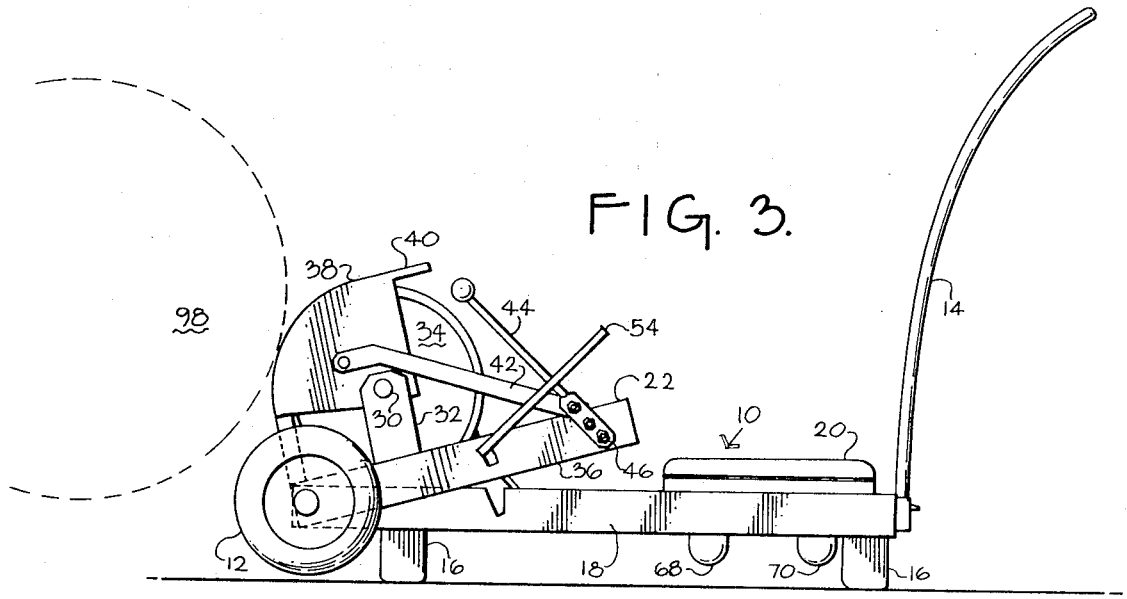
FIG. 3 is a side elevational view showing the platform raised and the quadrant cover in the "brake" position.

The cover 38 may be moved to a braking position as seen in FIG. 3 by the action of the pitmans 42 and brake lever 44. The brake levers 44 are each pivoted to the platform flanges 36 by pins 46. The brake levers are outboard of the flanges and the brake levers are connected together by rod 48. The pitmans 42 extend from the rod 48 and are pivoted to a pin upon the radial sides of the cover 38. Therefore, with the levers in the back position, the cover 38 is in the spinning position, but when the operator moves either one of the brake levers 44 forward, the other lever 44 and the brake cover 38 are moved into a braking position. In the braking position, front 50 of the cover 38 rests upon upstanding, protecting flange 52, which extends upward from the platform 22 in front of the roller 34.

Spinning levers 54 extend on either side of the chassis 10 and extend outward so they are outboard of the brake levers 44. The spinner levers 54 are connected together by valve bar 56. The valve bar is pivoted to the underside of the platform 22 by ears 57.

Air valve 58 is mounted to the underside of platform 22. It is a "button"-type valve, i.e., it has an operating plunger or button 60 depending from it. When this button is depressed, the valve 58 is open, permitting air under pressure to flow from flexible hose 62 to inlet tube 64 which connects valve 58 to the inlet 66 of the motor 26. The airhose is connected to oiler 68 which adds oil to the air. Water trap 70 is connected to the oiler 68 and the water trap removes water which may be carried in the air. Standard air connector 72 is connected to the water trap 70 and extends from the back of the chassis 10. It is a standard air connector so the standard airhoses found in this type shop may be readily connected to it and thus the connector 72 is means for furnishing air under pressure to the spinner and to the valve 58, thus to the motor 26.

The valve button 60 is located in the path of movement of the valve bar 56.

Valve lock bars 74 are mounted for longitudinal translation movement inasmuch as each has slot 76 at its forward end which is mounted upon pins 78 which project inward from the flanges 36. The rear of each lock bar 74 is pivoted to its brake lever 44. Each lock bar 74 has notch 80 which is aligned with the button 60 and the valve bar 56 when the brake levers 44 are in the rear position called the spinning position. However, when the brake levers 44 are moved forward, so that the brake quadrant cover 38 moves forward to act as a brake, the notch 80 is also moved forward so the bottom 82 of the lock bars 74 are aligned with the button 60 and valve bar 56.

Figure 4:
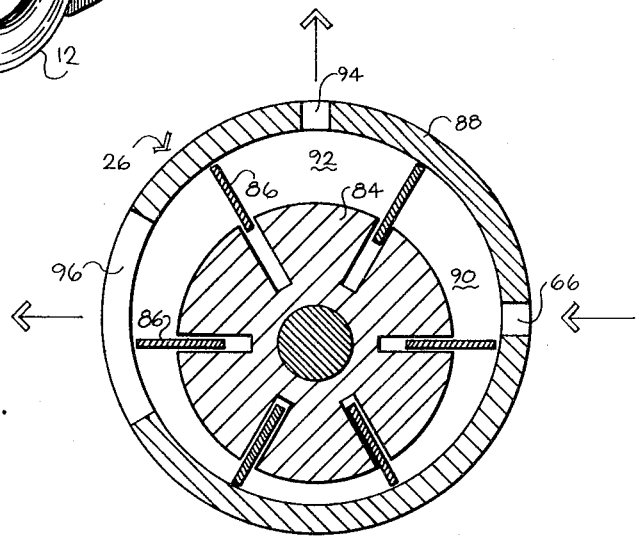
FIG. 4 is a schematic sectional view of the motor.

Referring to FIG. 4 it may be seen that the motor 26 is radial vane, expansible chamber, positive displacement, rotary type motor. I.e., the motor shaft 30 has rotor 84 attached to it, the rotor having slots in which radial vanes 86 are attached. The rotor is encased in eccentric housing 88. Therefore, as the air is introduced into the initial chamber 90, the chamber is enlarged as it rotates, as seen by the chamber 92, it being larger than the chamber 90. Thus, there is a positive displaced motor enlargement producing a high torque. Also, high torque at low speeds and at starting speeds is provided by providing exhaust port 94 as well as the regular exhaust port slots 96. I do not claim to have invented radial vane, expansible chamber, positive displacement pneumatic motors because they are well known and commercially available on the market. Therefore, the motor has been only schematically represented to show that this type motor is used because it exhibits the ideal characteristics I needed for an auto tire spinner.

OPERATION

In operation, first the spinner is moved to a tire 98 to be spun. The vehicle is lifted from the ground by conventional means. Then, the operator grasps the handle 14, lifting slightly on the handle, shifts the weight to the wheels 12 so the spinner is readily moveable so it is adjacent to the tire 98 to be spun. An air hose is connected to air connection 72.

With the brake lever 44 in the rear position, as seen in FIGS. 1, 2, and 5, the spinning lever 54 is moved forward. As the spinning lever 54 is moved upward and forward, the valve bar 56 contacts the button 60 and opens the valve 58. Inasmuch as the valve 58 may be spring loaded or have air pressure behind it, it may or may not open on first contact, but also at this time the platform 22 pivots forward bringing the spinning roller 34 into contact with the tire 98. Additional pressure on the lever 54 depresses the button 60 opening the valve 58 causing the tire to be spun. It is really a slight difference whether the roller 34 starts spinning before or after it contacts the tire 98. The lever 54 is held up until the tire 98 is spinning at a desired speed. This speed is determined by an experienced operator by listening to the exhaust of the air coming from the motor 96.

When the desired speed has been reached, the operator releases spinning lever 54 allowing the platform 22 to return to the down position. Then with tire 98 spinning, the mechanic does what work is necessary. When it is desired to stop the tire 98 and put the brakes on, the brake lever 44 is moved forward into the position as seen in FIG. 3. It will be noted that the brake lever can not be moved forward while the spinning lever 54 is raised; the reason being that the valve bar 56 is within the notch 80 and with valve bar 56 within the notch, the lock bar 74 cannot be moved forward. If the lock bar cannot be moved forward, the brake lever 44 may not be moved forward.

However, with the spinner lever 54 in the back down position, the brake lever 44 may be forward, which moves the quadrant cover 38 into the braking position and also moves the notch 80 forward. Thereafter, the platform may be raised by raising and moving forward the lever 54. In this instance the valve bar 56 will contact the bottom 82 of the lock bar and the pressure of the valve bar 56 against the bottom 82 will lift the platform 22 which brings the quadrant cover 38 into contact with the tire 98 as seen in FIG. 3 of the drawing. After the tire is stopped and the work is done, the spinner may be moved as before, i.e., the mechanic grasping the handle 14, lifting up slightly so the spinner rocks forward and the weight of the spinner is on the wheels 12 instead of the legs 16.

Thus it may be seen that I have provided a machine for efficiently spinning the wheels and tires of land vehicles.

The embodiments shown and described above are only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:

1. In a wheel spinner for spinning a ground-engaging wheel on a land vehicle, said wheel spinner
   a. having a chassis,
   b. wheels on the chassis for moving the wheel spinner from one location to another,
   c. a horizontal bar,
   d. a platform pivoted to the chassis by said bar,
   e. a spinner roller journaled to said platform,
   f. a motor mounted on the platform,
   g. said motor having an output shaft,
   h. said output shaft directly connected to said roller;
   j. the improvement comprising in combination with the above:
   k. said motor being a rotary pneumatic motor,
   m. said motor being a movable radial vane, expansible chamber, positive displacement, rotary pneumatic motor,
   n. a quadrant cover pivoted coaxially with said spinning roller,
   o. a spinning lever pivoted to the platform,
   p. a valve attached to the bottom of the platform and pneumatically connected to the motor,
   q. oil means for adding oil to compressed air connected to said valve upstream thereof,
   r. water catcher means for removing water condensate from air connected to said oil means upstream thereof,
   s. connector means for connecting a standard air fitting thereto connected to the water catcher means upstream thereof,
   t. a valve bar on the spinning lever to actuate said valve,
   u. a lock bar mounted for movement on the platform,
   v. said lock bar having a notch therein,
   w. a brake lever attached to said lock bar,
   x. said brake lever being attached to said quadrant cover,
   y. said brake lever pivoted to said platform,
   z. so that said quadrant cover and lock bar have two positions:
      i. a first spin position wherein the notch in the lock bar is aligned with the valve and valve bar and the quadrant is in a back spin position, and
      ii. a second brake position wherein said quadrant cover is in a forward braking position and the notch in the lock bar is not aligned with the valve and valve bar.

2. In a wheel spinner for spinning a ground-engaging wheel on a land vehicle, said wheel spinner
   a. having a chassis,
   b. wheels on the chassis for moving the wheel spinner from one location to another,
   c. a horizontal bar,
   d. a platform pivoted to the chassis by said bar,
   e. a spinner roller journaled to said platform,
   f. a motor mounted on the platform,
   g. said motor having an output shaft,
   h. said output shaft directly connected to said roller;
   j. the improvement comprising in combination with the above:
   k. said motor being a rotary pneumatic motor,
   m. a quadrant cover pivoted coaxially with said spinning roller,
   n. a spinning lever pivoted to the platform,
   o. a valve attached to the bottom of the platform and pneumatically connected to the motor,
   p. a valve bar on the spinning lever to actuate said valve, q. a lock bar mounted for movement on the platform,
r. said lock bar having a notch therein,
s. a brake lever attached to said lock bar,
t. a brake lever being attached to said quadrant cover,
u. said brake lever pivoted to said platform
v. so that said quadrant cover and lock bar have two positions:
  i. a first spin position wherein the notch in the lock bar is aligned with the valve and valve bar and the quadrant is in a back spin position, and
  ii. a second brake position wherein said quadrant cover is in a forward braking position and the notch in the lock bar is not aligned with the valve and valve bar.

3. The invention as defined in claim 2 with the additional limitation of
  m. said motor being an expansible chamber, positive displacement, rotary pneumatic motor.

4. The invention as defined in claim 2 with the additional limitation of
  m. said motor being a movable radial vane, expansible chamber, positive displacement, rotary pneumatic motor.

5. The invention as defined in claim 2 with the additional limitation of
  q. a water catcher means for removing water condensate from the air, interconnecting said source of compressed air under pressure and said valve means, and
  r. oil means for adding oil to said compressed air, interconnecting said water catcher and said valve.

* * * * *